(12) United States Patent
Obkircher et al.

(10) Patent No.: US 7,281,885 B2
(45) Date of Patent: Oct. 16, 2007

(54) HIGH-SPEED MILLING CUTTER

(75) Inventors: Peter Obkircher, Reutte (AT); Helmut Male, Höfen (AT)

(73) Assignee: Ceratizit Austria Gesellschaft m.b.H, Reutte (AT)

( * ) Notice: Subject to any disclaimer, the term of this patent is extended or adjusted under 35 U.S.C. 154(b) by 0 days.

(21) Appl. No.: 11/500,034

(22) Filed: Aug. 7, 2006

(65) Prior Publication Data

US 2007/0065239 A1    Mar. 22, 2007

Related U.S. Application Data

(63) Continuation of application No. PCT/AU2005/000047, filed on Feb. 14, 2005.

(30) Foreign Application Priority Data

Feb. 16, 2004   (AT) .............................. GM112/2004

(51) Int. Cl.
*B23P 15/28* (2006.01)
*B26D 1/00* (2006.01)

(52) U.S. Cl. ..................... 407/113; 407/101; 407/102

(58) Field of Classification Search ................ 407/113, 407/114, 115, 116, 117, 118, 119, 101, 66, 407/67, 31, 107
See application file for complete search history.

(56) References Cited

U.S. PATENT DOCUMENTS 3,597,104 A * 8/1971 Salcumbe ................... 408/199
5,542,795 A   8/1996 Mitchell
5,580,194 A * 12/1996 Satran et al. ................. 407/40
6,152,658 A * 11/2000 Satran et al. ............... 407/103
6,203,251 B1   3/2001 Oppelt et al.
6,607,333 B2 * 8/2003 Satran et al. ................. 407/33
6,796,751 B2 * 9/2004 Flolo ............................ 407/42
7,008,145 B2 * 3/2006 Astrakhan ..................... 407/35
7,168,895 B2 * 1/2007 Koskinen et al. ........... 409/140
2003/0219319 A1  11/2003 Arvidson

FOREIGN PATENT DOCUMENTS

| DE | 28 54 299 | 7/1979 |
|---|---|---|
| DE | 35 33 125 A1 | 3/1987 |
| DE | 44 19 668 C1 | 6/1995 |
| DE | 198 45 045 A1 | 4/2000 |
| EP | 0 469 672 A2 | 2/1992 |
| FR | 2 837 732 | 10/2003 |

* cited by examiner

*Primary Examiner*—Willmon Fridie, Jr.
(74) *Attorney, Agent, or Firm*—Laurence A. Greenberg; Werner H. Stemer; Ralph E. Locher

(57) ABSTRACT

A high-speed milling cutter has a tool parent body and one or more plate-shaped cutting inserts with a convex, approximately arc-shaped cutting edge. The insert(s) is/are fastened in an insert seat of the tool parent body. Mating elements with mutual contact surfaces for absorbing the centrifugal forces occurring during use are provided in each case between insert seat and cutting insert. The contact surface of the first mating element is designed in the shape of a circular arc, approximately concentrically to the cutting edge. The contact surface of the second mating element is likewise designed in the shape of a circular arc, approximately concentrically to the cutting edge, or consists of at least two contact zones which lie on an imaginary circular arc, approximately concentrically to the cutting edge, the contact surface or the imaginary circular arc coinciding with the contact surface of the first mating element.

6 Claims, 3 Drawing Sheets

SECTION II-II

SECTION II-II

HIGH-SPEED MILLING CUTTER

CROSS-REFERENCE TO RELATED APPLICATIONS

This is a continuing application, under 35 U.S.C. § 120, of copending international application No. PCT/AT2005/000047, filed Feb. 14, 2005, which designated the United States; this application also claims the priority, under 35 U.S.C. § 119, of Austrian application GM 112/2204 (Gebrauchsmuster), filed Feb. 16, 2004; the prior applications are herewith incorporated by reference in their entirety.

BACKGROUND OF THE INVENTION

Field of the Invention

The invention relates to a high-speed milling cutter with a tool parent body and at least one plate-shaped cutting insert which has a convex, approximately arc-shaped cutting edge and is fastened in an insert seat of the tool parent body. Mating elements with mutual contact surfaces for absorbing the centrifugal forces occurring during use are provided in each case between the insert seat and the cutting insert.

In order to permit machining in as efficient a manner as possible, high-speed processes in which the milling tools work at speeds of up to 100,000 revolutions per minute are used in the milling of workpieces made of light alloy, such as aluminum for example. Very high centrifugal forces occur at the milling tool due to these high speeds, and these centrifugal forces subject the individual tool parts to the most extreme stress. Thus, in particular, the clamping screws with which the cutting inserts are often fastened to the tool parent body are subjected to very high shearing stress by the centrifugal forces, which act on the cutting inserts. In order to largely relieve the clamping screws of these shearing forces which occur, it is known to provide special mating elements between the cutting inserts and the insert seat of the tool parent body, these mating elements absorbing most of the centrifugal forces which occur in order to thus prevent the clamping screws from being subjected to excessively high shearing stress by a cutting insert displaced on the insert seat.

Cutting inserts which are in engagement with the insert seat via a tongue-and-groove connection have been disclosed. As a rule, the bearing surface of the cutting insert thereby has a straight, tongue-shaped prominence which engages in a correspondingly shaped groove in the insert seat of the tool parent body. In practice, however, it is not always possible to orient the mutual contact surfaces of the tongue-and-groove connection exactly perpendicularly to the centrifugal forces which occur, for which reason force components occur which also act on the cutting insert parallel to the contact surfaces. These contact surfaces are therefore not adequate for clearly defined positioning of the cutting edge and precise fixing of the axial and radial true running of the milling tool, and a lateral change in position of the cutting insert occurs with respect to the contact surfaces. This lateral change in position can certainly be absorbed theoretically by the clamping screws, but in practice this is effected only inadequately, since the production tolerances of the screw holes then come into effect again. In such milling tools, therefore, considerable changes in the rotational geometry of the milling tool may occur on account of the centrifugal forces acting during operation.

German published patent application DE-A 35 33 125 describes intermeshing tooth systems as form-fitting connections between cutting insert and insert seat which are intended to absorb the centrifugal forces, the teeth of these tooth systems running parallel to the milling cutter axis and having a certain flank angle. In this case, the mutual contact surfaces are certainly oriented fairly accurately perpendicularly to the centrifugal forces which occur, and force components parallel to the contact surfaces scarcely occur. However, the disadvantage of such an embodiment lies in the fact that there is redundancy in determination due to the multiplicity of mutual contact surfaces, as a result of which no clearly defined positioning of the cutting inserts in the tool parent body is ensured.

SUMMARY OF INVENTION

It is accordingly an object of the invention to provide a high-speed milling cutter, which overcomes the above-mentioned disadvantages of the heretofore-known devices and methods of this general type, i.e., high-speed milling cutters comprising cutting inserts having a convex, approximately arc-shaped cutting edge, and to provide a form fit between cutting insert and tool parent body, by means of which form fit the clamping elements for securing the cutting insert are largely relieved of the loads occurring during use which are caused by the centrifugal forces, and by means of which form fit the smallest possible dimensional deviations occur in the rotational geometry, even when the contact surfaces of the form fit are not oriented perpendicular to the centrifugal forces which occur.

With the foregoing and other objects in view there is provided, in accordance with the invention, a high-speed milling cutter, comprising:

a tool parent body formed with an insert seat;

at least one plate-shaped cutting insert fastened in the insert seat of the tool parent body, the cutting insert having a convex, substantially arc-shaped cutting edge;

first and second mating elements with mutual contact surfaces for absorbing centrifugal forces occurring during use of the milling cutter between the insert seat and the cutting insert;

the first mating element having a contact surface with a shape of a circular arc, substantially concentric with the cutting edge;

the second mating element having a contact surface with at least two contact zones lying on an imaginary circular arc, substantially concentric with the cutting edge; and the imaginary circular arc coinciding with the contact surface of the first mating element.

In accordance with an added feature of the invention, the contact surface of the second mating element is a circular arc coinciding with the imaginary circular arc and including the at least two contact zones. That is, the mating surface is a continuous surface, as opposed to only two or more contact zones—for instance formed by two or more knob-shaped elevations—that extend congruently with the imaginary arc.

In other words, the objects of the invention are achieved in that the contact surface of the first mating element is designed in the shape of a circular arc, approximately concentrically to the cutting edge, and in that the contact surface of the second mating element is likewise designed in the shape of a circular arc, approximately concentrically to the cutting edge, or consists of at least two contact zones which lie on an imaginary circular arc, approximately concentrically to the cutting edge, the contact surface or the imaginary circular arc coinciding with the contact surface of the first mating element.

Such a configuration enables the pitch circle and thus the rotational geometry of the milling tool to be determined solely by the mating accuracy of the mutual contact surfaces of the mating elements. Here, lateral force components which are caused by the centrifugal forces and which, according to the prior art, would cause a lateral movement of the cutting insert and thus a change in the rotational geometry only produce a change in position of the cutting insert along the circular contact surface. Since this contact surface runs approximately concentrically to the cutting edge, scarcely any change in the pitch circle and thus scarcely any change in the rotational geometry are produced as a result.

It is especially advantageous if both the contact surface of the first mating element and that of the second mating element are designed in the shape of a circular arc. In this way, the contact surfaces can be produced especially easily.

The use of a cutting insert which is in the shape of a ring segment in the basic form has proved successful as an especially preferred variant. In this case, the cutting insert has a single cutting edge. The angular dimension of the circle segment may vary. In practice, depending on the application, ring segments with angular dimensions of about 70° and about 120° have proved successful. The insert seat of the tool parent body is in this case advantageously designed for the cutting insert having the larger angular dimension, two clamping screws, for example, being provided for fixing the cutting insert. In a tool parent body of such a design, a cutting insert having a smaller angular dimension can then also be used, and this cutting insert is then fastened only with one clamping screw. A correspondingly adapted spacer without a cutting function is then fastened by means of the second clamping screw in the remaining gap of the insert seat.

However, it is equally conceivable to provide the cutting insert with two opposite convex cutting edges in the shape of a circular arc, thereby allowing dual use of the cutting insert.

It is especially advantageous if the individual mating elements on the high-speed milling tool are designed in a known manner as a tongue-and-groove connection. This results in an especially space-saving configuration of cutting insert and insert seat.

The tongue-shaped mating element may be provided on both the cutting insert and the insert seat, and the groove-shaped mating element may be provided on the corresponding other tool parts. However, it has proved especially successful if the tongue-shaped mating element is provided on the cutting insert and the groove-shaped mating element is provided on the insert seat. As a result, unnecessary weakening of the generally thin plate-shaped cutting insert is avoided. By the tongue-shaped mating element being dimensioned to be more or less large in its width, adaptation of the cutting insert to the centrifugal forces, occurring during operation, is made possible as a function of the size of the cutting insert, so that sufficient stability of the cutting insert is ensured under all conditions.

Other features which are considered as characteristic for the invention are set forth in the appended claims.

Although the invention is illustrated and described herein as embodied in a high-speed milling cutter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
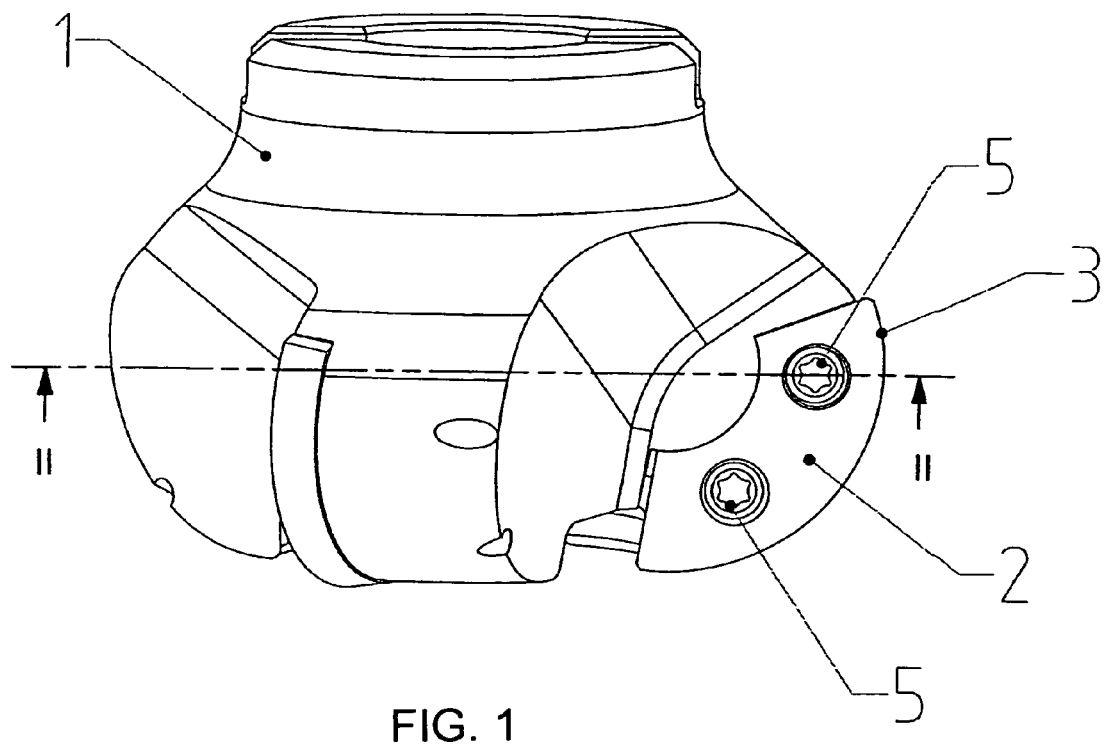
FIG. 1 is a side perspective view of a milling tool according to the invention.
Figure 2:
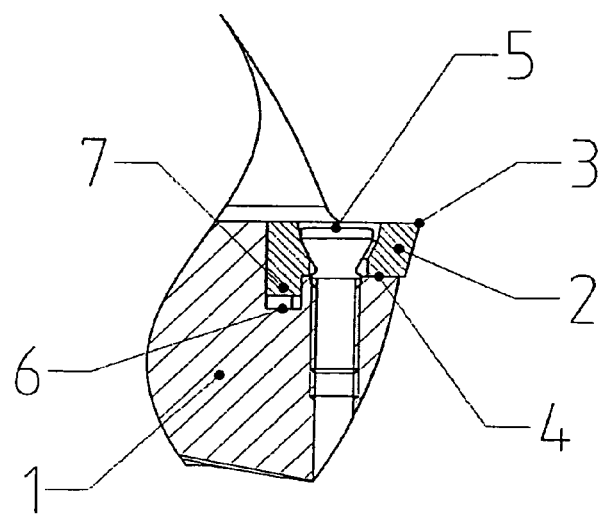
FIG. 2 is a partial sectional view of the milling tool according to FIG. 1 taken along the line II-II.
Figure 3:
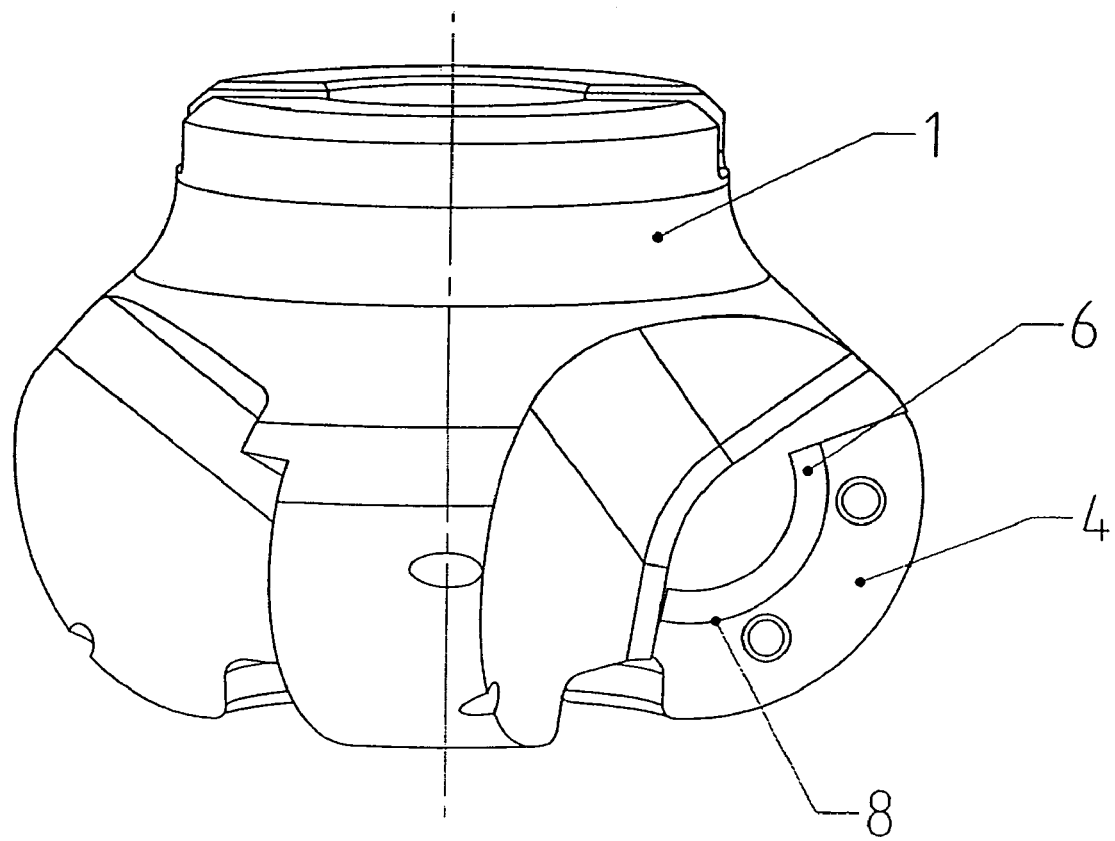
FIG. 3 is a side perspective view of the milling tool according to FIG. 1 without cutting insert.
Figure 4:
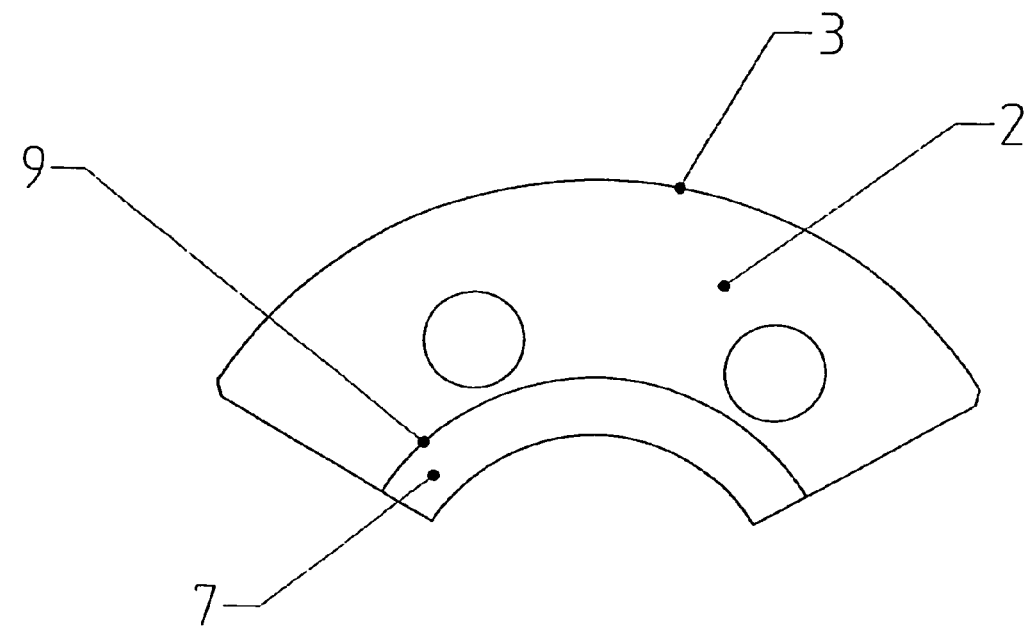
FIG. 4 is a bottom view of the cutting insert for a milling tool according to the invention.

Referring now to the figures of the drawing in detail and first, particularly, to FIG. 1 thereof, the milling tool according to the invention has a tool parent body 1 with three cutting inserts 2 in the shape of a circular segment. The inserts 2 thereby have an arc angle of about 120° and they are fastened at equal angular distances to the periphery about the circumference of the tool parent body 1. An insert seat 4 for accommodating a cutting insert 2 can be seen in FIG. 3. The insert seat 4 is adapted approximately to the shape of the cutting insert 2 and has, on the inner side of the tool parent body 1, a groove 6 in the shape of a circular arc and having a contact surface 8. A tongue-shaped prominence 7 which is provided on the underside of the cutting insert 2 engages in the groove 6. The tongue-shaped prominence 7 is provided on that end of the cutting insert 2 in the shape of a circular arc which is opposite the cutting edge 3 in the shape of a circle segment and runs concentrically to the cutting edge 3. The cutting insert 2 is fastened to the insert seat 4 by two screws 5 which engage in corresponding holes in the tool parent body 1. In the fastened state, the contact surface 8 in the groove 6 of the insert seat 4 and the contact surface 9 on the web-shaped prominence 7 of the cutting insert 2 bear against one another and largely prevent dimensional deviations in the rotational geometry during use of the milling tool.

Figure 5:
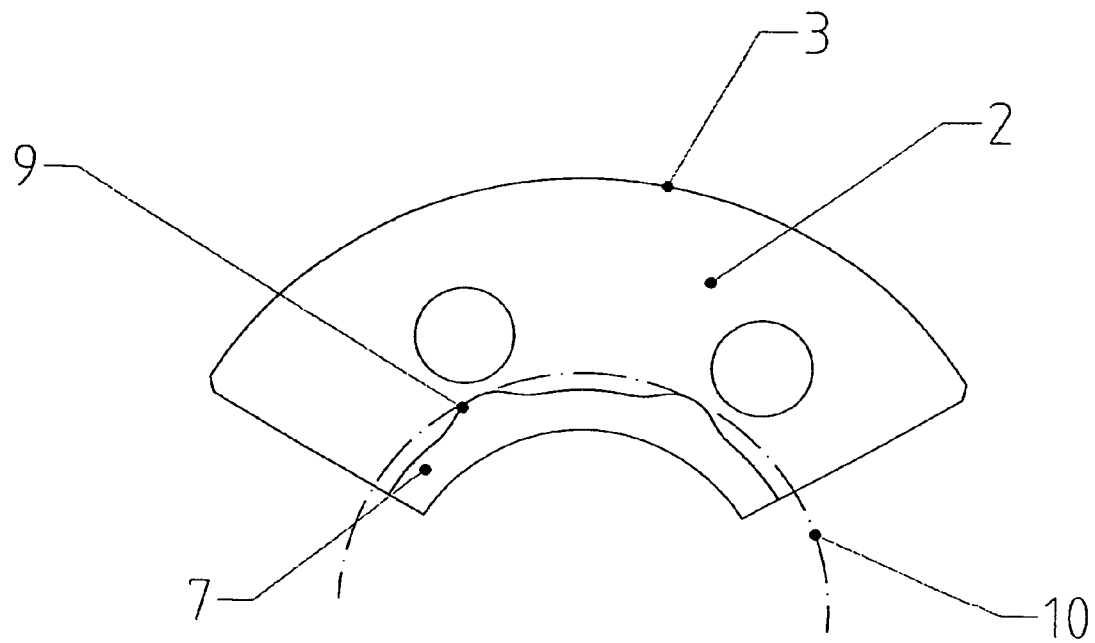
FIG. 5 is a bottom view of a variant of a cutting insert for a milling tool according to the invention.

A variant of a cutting insert 2 for the milling tool according to the invention is shown in FIG. 5. There, the web-shaped prominence 7, on the side facing the cutting edge 3, has a contact surface 9 in the form of two knob-shaped prominences with contact zones which lie on an imaginary circular arc 10 which coincides with the contact surface 8 in the groove 7 of the insert seat. In this way, the contact surfaces 8 and 9 bear against one another in an especially accurate manner.

The preferred variant of a milling tool according to the invention is shown in the drawings, but the invention is on no account restricted thereto. Thus, for instance, the first mating element 6 may be provided not only as shown on the insert seat 4 but also on the cutting insert 2, and accordingly the second mating element 7 may be provided on the insert seat 4 and not on the cutting insert 2. Likewise, in an embodiment of the mating elements 6, 7 as a tongue-and-groove connection, the tongue-shaped mating element 6, 7 may be provided on the insert seat 4 and the groove-shaped element 6, 7 may be provided on the cutting insert.

Likewise, the fastening of the cutting insert 2 may be effected not only by clamping screws 5 as shown but also by other clamping elements, such as wedges or clamping shoes, for example.

We claim:

1. A high-speed milling cutter, comprising:
   a tool parent body formed with an insert seat;
   at least one plate-shaped cutting insert fastened in said insert seat of said tool parent body, said cutting insert having a convex, substantially arc-shaped cutting edge;
   first and second mating elements with mutual contact surfaces for absorbing centrifugal forces occurring during use of the milling cutter between said insert seat and said cutting insert;
   said first mating element having a contact surface with a shape of a circular arc, substantially concentric with said cutting edge;
   said second mating element having a contact surface with at least two contact zones lying on an imaginary circular arc, substantially concentric with said cutting edge; and
   said imaginary circular arc coinciding with said contact surface of said first mating element.

2. The high-speed milling cutter according to claim 1, wherein said contact surface of said second mating element is a circular arc coinciding with said imaginary circular arc and including said at least two contact zones.

3. The high-speed milling cutter according to claim 1, wherein said cutting insert has a basic shape of a ring segment.

4. The high-speed milling cutter according to claim 1, wherein said mating elements are tongue-and-groove connection elements.

5. The high-speed milling cutter according to claim 4, wherein said first mating element is a tongue-shaped mating element formed on said cutting insert and said second mating element is a groove-shaped mating element formed at said insert seat.

6. A cutting insert for a high-speed milling cutter according to claim 1.

* * * * *